United States Patent Office 2,978,457
Patented Apr. 4, 1961

2,978,457

5 - ACYLAMIDO - 4 - SUBSTITUTED - THIAZOLE-2-SULFONAMIDES HAVING DIURETIC PROPERTIES

James M. Sprague, Gwynedd Valley, and John B. Bicking, Lansdale, Pa., assignors to Merck & Co., Inc., Rahway, N.J., a corporation of New Jersey No Drawing. Filed Apr. 6, 1959, Ser. No. 804,135

3 Claims. (Cl. 260—306.8)

This invention relates to novel 5-acylamido-4-subst.-thiazole-2-sulfonamides and alkali metal salts thereof, which have the structural formula:

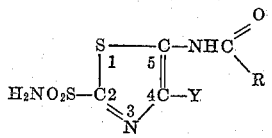

where R is an alkyl group having from 1 to 3 carbon atoms, and Y is selected from the group consisting of chlorine and phenyl.

The new compounds in accordance with this invention are useful chemo-therapeutic agents particularly because of their diuretic properties. The compounds can be administered in therapeutic dosages in conventional vehicles as in the form of a tablet, since they are effective when administered orally as well as when injected. Since the alkali metal salts of the compounds of this invention are also readily soluble in an isotonic aqueous medium, injectable solutions can be prepared by dissolving the compounds in the selected medium. The alkali metal salts are stable of themselves, although preservatives may be added if desired.

The dosage of the 5-acylamido-4-subst.-thiazole-2-sulfonamides may be varied over a wide range and for this reason, scored tablets containing 100, 150, 250 and 500 milligrams of the active ingredient may be made available to the physician for the symptomatic adjustment of the dosage to the individual patient. These dosages are well below the toxic or lethal dose of the compounds.

5-acylamido-4-subst.-thiazole-2-sulfonamides in accordance with this invention are readily prepared by reacting the corresponding 2-mercapto-5-acylamido-4-substituted-thiazole with chlorine in order to produce the corresponding sulfonyl chloride, and then reacting the product with ammonia in order to produce the sulfonamide. The starting materials may readily be prepared in accordance with methods well known in the art, as will further be developed herein.

The alkali metal salts of the compounds of this invention are prepared with convenience by dissolving the compounds in an aqueous or alcoholic solution of the selected alkali metal hydroxide and, if desired, isolating the salt by evaporating the solvent. Any of the conventional alkali metal salts, such as sodium, potassium, lithium or the like salts, can be prepared by this method or by any other methods conventionally used and well known to skilled organic chemists.

The preparation of these compounds is more fully described in the following examples. It is to be understood, however, that the examples are illustrative of the methods employed for their preparation and are not to be construed as limiting the invention to the particular reaction conditions specifically described.

EXAMPLE 1

*5-acetamido-4-phenylthiazole-2-sulfonamide*

5-acetamido-4-phenyl-2-mercaptothiazole (7.5 g., 0.03 mole) and 140 cc. of a 70% solution of acetic acid in water were cooled to 2° C. The starting material was prepared in accordance with the method of Cook, Heilbron and Levy, J. Chem. Soc. 1947, 1598. Chlorine was bubbled in until 6.0 g. was absorbed. The temperature was maintained at 5° C. The mixture was poured into 200 cc. of ice water. The crystalline sulfonyl chloride which precipitated was collected and added to 75 cc. of liquid ammonia. The solid remaining when the ammonia evaporated was dissolved in 5% sodium hydroxide solution. The solution was filtered and acidified to precipitate the sulfonamide which when recrystallized from a solvent combination of ethanol, dimethylformamide and water melted at 237° C. with decomposition.

An analysis of the product showed that it corresponded closely to the empirical formula $C_{11}H_{11}N_3O_3S_2$, confirming that the compound was 5-acetamido-4-phenylthiazole-2-sulfonamide.

The compound thus prepared was used in activity tests which revealed the compound to be active at one-quarter of the full dose, intravenously, the full dose being conventionally and arbitrarily set at an initial priming dose of 25 milligrams per kilogram of body weight, followed by an infusion dose of 30 mg./kg./hr. These tests were run in dogs.

EXAMPLE 2

*5-acetamido-4-chlorothiazole-2-sulfonamide*

5-acetamido-2-mercaptothiazole (5.2 g., 0.03 mole) was suspended in 60 cc. of a 75% solution of acetic acid in water. The starting material was prepared by the method of Cook, Heilbron and Levy, J. Chem. Soc. 1948, 205. The mixture was maintained at 5° C. while chlorine was bubbled in until 8.6 g. (0.12 mole) of the gas had been absorbed. The mixture was poured in 250 cc. of ice water. The oil which separated was taken up in ether, dried over sodium sulfate and slowly poured into 50 cc. of liquid ammonia. When the ammonia had evaporated, the residue was dissolved in water and the solution acidified to precipitate the crude sulfonamide. The product when purified from a solvent combination of water and isopropyl alcohol had a melting point of 227–228° C. with decomposition.

An analysis of the product showed that it corresponded closely to the empirical formula $C_5H_6ClN_3O_3S_2$, confirming that the compound was 5-acetamido-4-chlorothiazole-2-sulfonamide.

The foregoing compound, when subjected to activity tests, revealed an activity at ½₀ of the full dose, intravenously, the full dose being conventionally and arbitrarily set at an initial priming dose of 25 milligrams per kilogram of body weight followed by an infusion dose of 30 mg./kg./hr. The compound is also active when administered orally, only ¼ of the full dose being required, the full oral dose is 30 mg./kg. Tests were run in dogs.

Toxicity tests on mice showed the active dose to be far below the lethal dose. The $LD_{50}$ is above 600 mg. per kilogram of body weight, and represents the least dosage that should kill one-half of the animals receiving the dose.

EXAMPLE 3

*5-butyramido-4-chlorothiazole-2-sulfonamide*

STEP 1.—PREPARATION OF 5-BUTYRAMIDO-2-MERCAPTOTHIAZOLE 5-amino-2-mercaptothiazole (48.0 g., 0.365 mole) was added to butyric anhydride (142 g., 0.90 mole). The 5-amino-2-mercaptothiazole was prepared by the method of Cook, Heilbron and Levy, J. Chem. Soc., 1948, 205. After 40 minutes, the mixture was treated with 10% sodium hydroxide solution. The resulting solution was filtered and acidified to precipitate the product which when recrystallized from a water-isopropyl alcohol mixture, had a melting point of 209–211° C. (decomposition).

An analysis of the product showed that it corresponded closely to the empirical formula $C_7H_{10}N_2OS_2$, confirming that the compound was 5-butyramido-2-mercaptothiazole.

STEP 2.—PREPARATION OF 5-BUTYRAMIDO-4-CHLOROTHIAZOLE-2-SULFONAMIDE

The 5-butyramido-2-mercaptothiazole, from step 1, (8.6 g., 0.0425 mole) was suspended in 75 cc. of a 70% solution of acetic acid in water. The mixture was maintained at 5° C. while chlorine was bubbled in until 12.1 g. (0.17 mole) of the gas had been absorbed. The resulting solution was poured into ice water. The oil which separated was taken up in ether, dried over sodium sulfate and added to 50 cc. of liquid ammonia. The residue after evaporation of ammonia was recrystallized from a water-isopropyl alcohol mixture to give the pure sulfonamide, M.P. 220–21° C. (decomposition).

An analysis of the product showed that it corresponded closely to the empirical formula $C_7H_{10}N_3O_3S_2Cl$, confirming that the compound was 5-butyramido-4-chlorothiazole-2-sulfonamide.

Activity tests of this compound revealed the compound to be active at 1/20 of the full dose, intravenously, the full dose being conventionally and arbitrarily set at an initial priming dose of 25 milligrams per kilogram of body weight followed by an infusion dose of 30 mg./kg./hr. The compound is also active when administered orally, only ¼ of the full dose being required, the full oral dose being 30 mg./kg. The activity tests were run in dogs.

Toxicity tests on mice showed the active dose to be far below the lethal dose. The $LD_{50}$ is about 344 mg. per kilogram of body weight, and represents the least dosage that should kill one-half of the animals receiving the dose.

EXAMPLE 4

The product of Example 1 is reacted with an equivalent amount of NaOH, producing the sodium salt.

Activity tests of this compound revealed the compound to be active at 1/20 of the full dose, intravenously, the full dose being conventionally and arbitrarily set at an initial priming dose of 25 milligrams per kilogram of body weight followed by an infusion dose of 30 mg./kg./hr. The activity tests were run in dogs.

The active dose is far below the lethal dose.

EXAMPLE 5

Compressed tablet containing 250 milligrams of active ingredient per tablet, in a quantity suitable for fifty tablets:

|  | Grams |
|---|---|
| 5-acetamido-4-phenylthiazole-2-sulfonamide | 12.500 |
| Calcium phosphate tribasic | 2.095 |
| Methylcellulose 15 cps. 2%, 3 cc. | 0.060 |
| Starch paste 10%, 1 part; gelatin solution 20%, 1 part, 3 cc. | 0.450 |
|  | 15.105 |
| Methylcellulose 15 cps. | 0.750 |
| Talc, dried | 0.750 |
|  | 16.605 |

5-acetamido-4-phenylthiazole-2-sulfonamide and calcium phosphate tribasic are mixed together and then passed twice through No. 60 bolting cloth. The methylcellulose solution is then added and thoroughly mixed in the granulation and the mixture then passed through a No. 10 screen. The starch-gelatin solution is then added to the granulation, thoroughly mixed, and passed through a No. 10 screen after which the total granulation is oven dried at between about 120 to 130° F. for 16 to 18 hours, and passed through a No. 18 screen. The methylcellulose is passed through a No. 60 bolting cloth onto this granulation and blended thoroughly therewith after which the talc is passed through a No. 60 bolting cloth and also thoroughly mixed with the granulation. The resulting granulation is compressed into tablets having a 13/32" standard curvature punch yielding 50 tablets having a thickness of 0.155 to 0.160 inch, ten of which weight 3.321 grams. The tablets have a hardness of 5 to 6 kilograms measured by the Monsanto Chemical Company tablet hardness tester apparatus, and a disintegration time of 12 minutes when tested by the U.S.P. tablet disintegrating apparatus (U.S. Pharmacopoeia 15th edition p. 937).

The other compounds disclosed herein may also be formed into tablets using the method referred to in the foregoing example.

EXAMPLE 6

The following is a suitable mixture, showing appropriate quantities per tablet:

|  | Milligram |
|---|---|
| 5-acetamido-4-chlorothiazole-2-sulfonamide | 250 |
| Calcium phosphate tribasic | 40 |
| Starch (as 12.5% starch paste) | 12.5 |
| Total | 302.5 |

To the foregoing, the following mixture is added:

| Corn starch | 15 |
|---|---|
| Magnesium stearate | 2.5 |
| Total weight | 320.0 |

The above ingredients are mixed, bolted, and compressed into tablets in substantially the same manner described in Example 5.

The other compounds specifically disclosed herein may similarly be formed into tablets using the procedure described in Example 6 above.

While the above examples have described the preparation of certain specific compounds and a certain specific dosage form suitable for administering the novel compounds of this invention in human therapy, it is to be understood that the invention is not to be limited by these examples or by the specific reaction conditions described for the preparation of the compounds or by the specific ingredients included in the pharmaceutical preparation. On the contrary, it is understood that this invention embraces variations and modifications, including the use of equivalent methods of preparation. However, it is also to be understood that this invention is specifically limited to the compounds defined in the claims and does not extend to the substitution of any other groups for those which are specifically defined in the claims.

Having thus described our invention, we claim:

1. 5-acetamido-4-chlorothiazole-2-sulfonamide.
2. 5-butyramido-4-chlorothiazole-2-sulfonamide.
3. A 5-acylamido-4-substituted thiazole-2-sulfonamide corresponding to the formula:

$$\begin{array}{c} S\text{---}\underset{5}{C}\text{---}NHC\overset{O}{\diagdown}R \\ | \quad \; \; || \\ H_2NSO_2\text{---}\underset{3}{C}\underset{N}{\diagup}4C\text{---}Cl \end{array}$$

where R is an alkyl group having from 1 to 3 carbon atoms.

References Cited in the file of this patent

UNITED STATES PATENTS 2,783,241    Young et al. _____ Feb. 26, 1957

OTHER REFERENCES

Bogomolev et al.: Chem. Abstracts, vol. 48, col. 8654 (1954).

Das et al.: Chem. Abstracts, vol. 50, cols. 12026–7 (1956).